United States Patent [19]

Tharpe et al.

[11] 4,010,378
[45] Mar. 1, 1977

[54] INTEGRATED ELECTRIC GENERATING AND SPACE CONDITIONING SYSTEM

[75] Inventors: Bobby J. Tharpe, Phoenixville; James C. Graf, Fort Washington, both of Pa.

[73] Assignee: General Electric Company, Fairfield, Conn.

[22] Filed: Dec. 20, 1974

[21] Appl. No.: 534,711

[52] U.S. Cl. .................................. 290/2; 60/693; 62/236
[51] Int. Cl.² ........................................ F01K 15/00
[58] Field of Search ................ 290/2; 60/648, 690, 60/692, 693; 62/2, 236

[56] References Cited
UNITED STATES PATENTS

| | | | |
|---|---|---|---|
| 2,962,873 | 12/1960 | Anderson | 62/236 |
| 3,219,831 | 11/1965 | Ray et al. | 290/2 |
| 3,620,008 | 11/1971 | Newbold | 290/2 |

Primary Examiner—Robert K. Schaefer
Assistant Examiner—John W. Redman
Attorney, Agent, or Firm—Raymond H. Quist; Allen E. Amgott

[57] ABSTRACT

A vapor generator vaporizes a motive fluid which is used to drive a multivaned rotary expander. The expander is the prime mover for an electric generator which may be an alternator. Exhausted vapor from the expander (or if the expander is not being operated, vapor from the vapor generator) is passed through a heat exchanger where a fluid, e.g. air or water, is heated. This heated fluid is used for space heating. The expander may also be connected to drive the compressor for an air conditioning system. Alternatively, an electric motor may be employed for this purpose.

4 Claims, 12 Drawing Figures

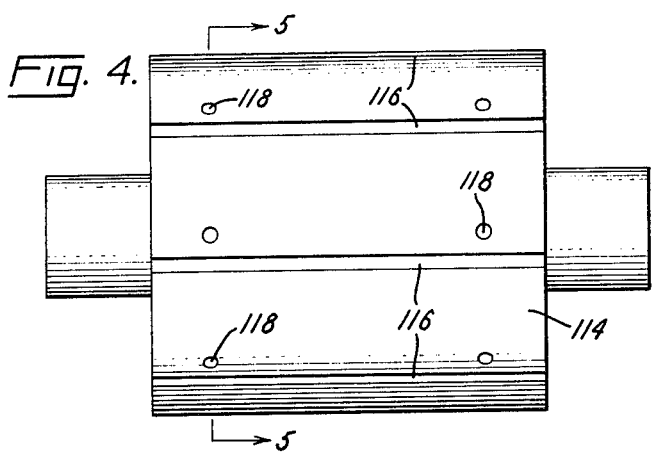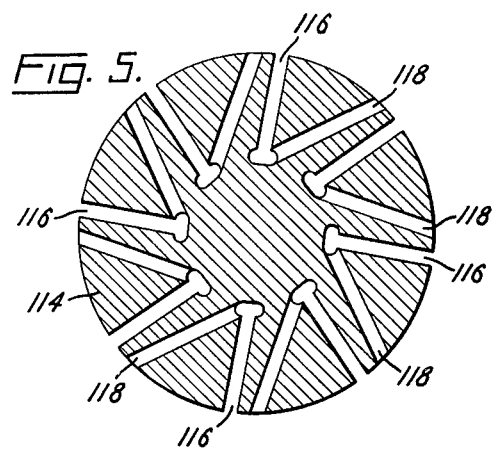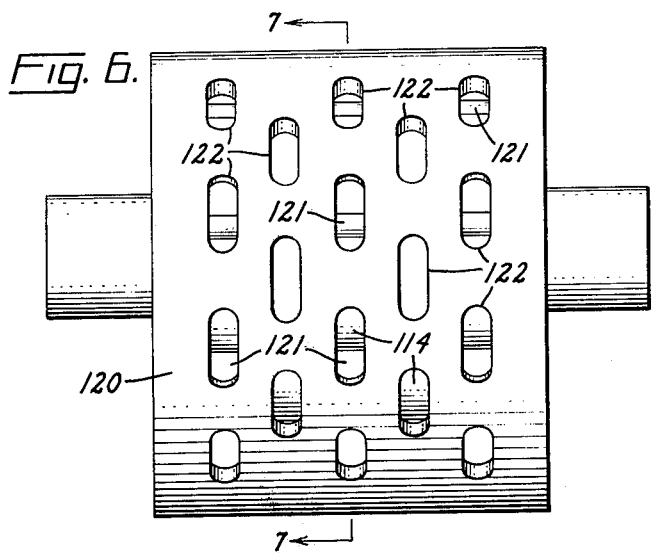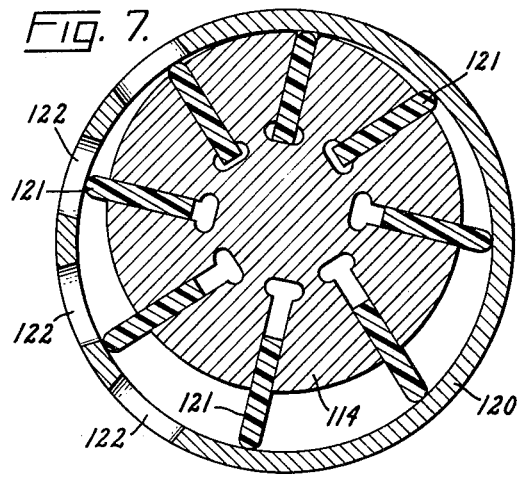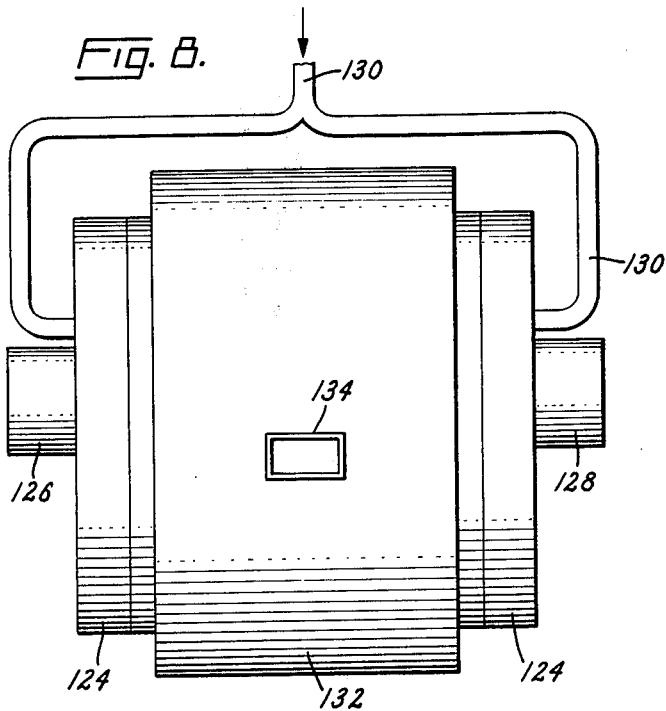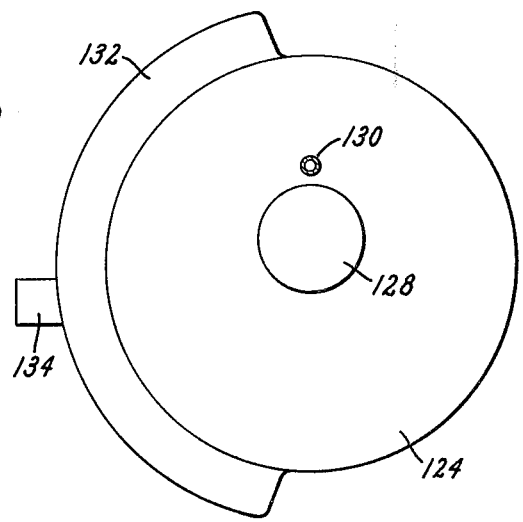

INTEGRATED ELECTRIC GENERATING AND SPACE CONDITIONING SYSTEM

BACKGROUND OF THE INVENTION

This invention relates generally to electrical generating systems and more particularly to such systems with the added capabilities of heating and air conditioning.

Mobile living quarters such as campers, trailers and boats, as well as stationary buildings at remote locations have been limited in comfort and utility because of a lack of electric power generating capability. Although conventional internal combustion engine powered generators might be employed, these are noisy and the exhaust is high in pollutants. Thus there is a need for a quiet electric generating system which will minimize air pollutants.

Space conditioning, i.e. heating and cooling, is also desirable for such living quarters.

SUMMARY OF THE INVENTION

In a preferred form of the invention, a vapor generator vaporizes a motive fluid which is used to drive a multivaned rotary expander. An alternator, driven by the expander, provides electrical power. The expander may also be employed to drive the compressor of an air conditioner. Alternatively, the compressor may be driven by an electric motor. Vapor from the vapor generator or vapor exhausted from the expander is used to heat a fluid for space heating.

BRIEF DESCRIPTION OF THE DRAWINGS

FIG. 4 is an elevation of the rotor of a rotary multivaned expander suitable for use in the system of FIG. 1;

FIG. 5 is a cross-section of the rotor of FIG. 4;

FIG. 6 is an elevation of the rotor of FIG. 4 contained in a liner;

FIG. 7 is a cross-section of FIG. 6;

FIG. 8 is a front elevation of the complete expander;

FIG. 9 is a side elevation of the complete expander; and

DESCRIPTION OF THE PREFERRED EMBODIMENT

Figure 1:
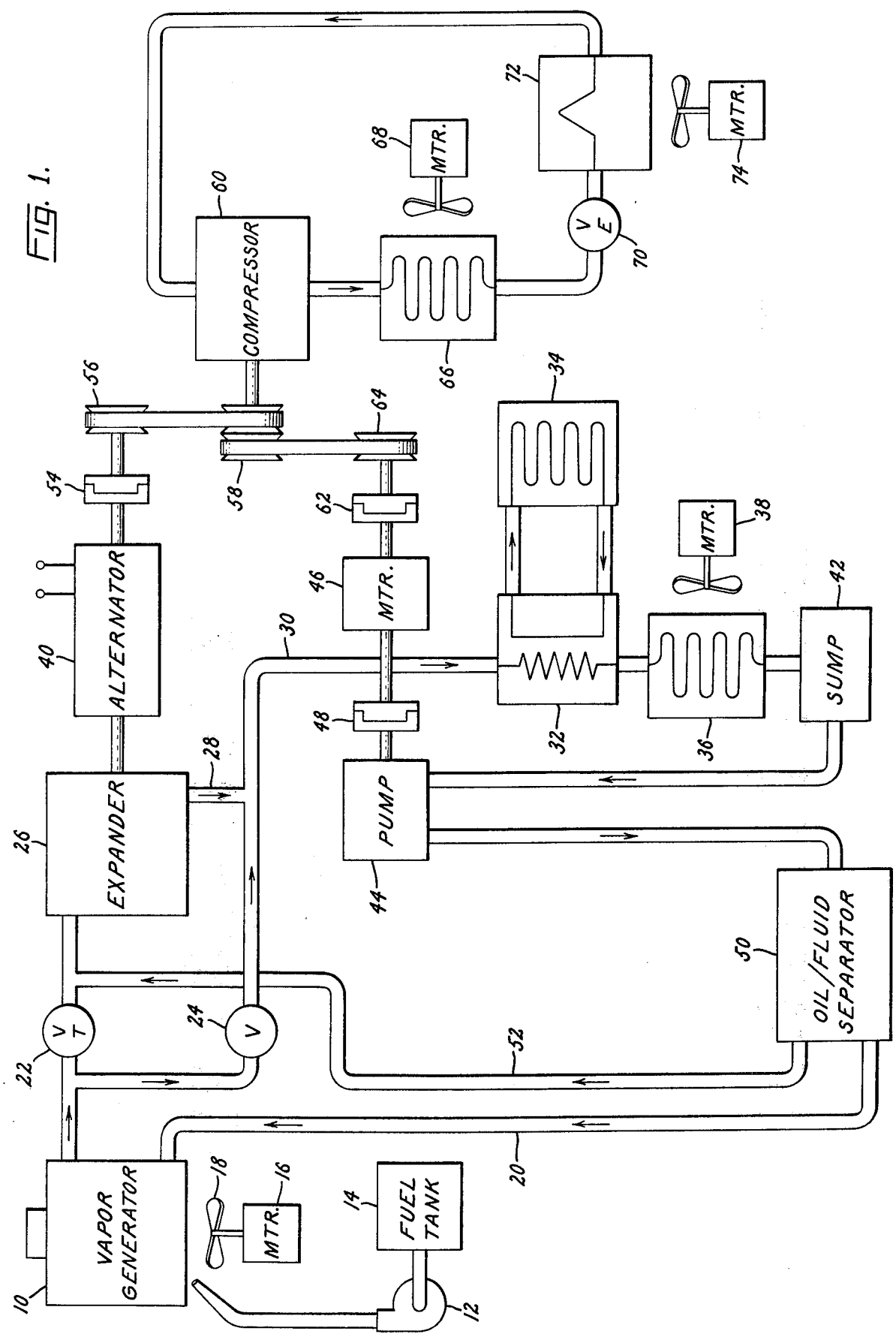
FIG. 1 illustrates schematically the overall system of this invention.

Referring to FIG. 1, vapor generator 10 is supplied with fuel by pump 12 from fuel tank 14. Unleaded gasoline has been satisfactory as a fuel; however, other liquid hydrocarbons and gaseous hydrocarbons may also be employed. Motor 16 drives fan 18 to supply air to vapor generator 10.

Vapor generator 10 also is supplied with a liquid motive fluid via tube 20. Trifluoroethanol together with water has been found effective as a motive fluid; however, many other fluids for Rankine cycle engines have been proposed by others and may be satisfactory.

The vaporized motive fluid, preferably superheated, is conveyed through either throttle valve 22 or two position valve 24. If rotary prime mover 26 is to be driven, throttle valve 22 is opened a desired amount and valve 24 is closed. Although other types of rotary prime movers may be employed a multivaned rotary expander is preferred.

The expander vapor is conveyed via tubes 28 and 30 to heat exchanger 32. In heat exchanger 32, the vapor is used to heat fluid such as water or air which in turn heats the living quarters by means of, for example, radiator 34.

After passing through heat exchanger 32, the vapor is condensed in condenser 36 with its associated blower 38. In a system designed for marine application a liquid cooled condensor may be employed.

Expander 26, when driven by the vaporized motive fluid, rotates electric generating means shown in FIG. 1 as alternator 40. Any suitably sized generating means producing alternating or direct current may be employed as desired.

At times there may be no need for generating electricity, for example, when an alternate source is available. At such times throttle valve 22 is closed and valve 24 is opened. Vapor is then conveyed via tube 30 directly to heat exchanger 32 from vapor generator 10.

The condensed motive fluid from condenser 36 passes into sump 42 which serves as a storage tank for the fluid when the system is not operating.

Pump 44 is driven by motor 46 through clutch 48. Pump 44 is the feed pump for the system and delivers the liquid motive fluid to oil/fluid separator 50. Lubrication of expander 26 may be accomplished by supplying oil via tube 52 to the inlet of the expander. The liquid motive fluid is supplied to vapor generator 10 via tube 20 as previously indicated.

Provision is made for air conditioning the living quarters by this system. When expander 26 is operating, clutch 54 is engaged to rotate pulley 56, which in turn rotates pulley 58 to power compressor 60. When expander 26 is not operating, and an alternate supply of electricity is available, clutch 62 is engaged so that motor 46 rotates pulley 64 to power compressor 60 through pulley 58. The air conditioning system is of the usual type comprising, in addition to compressor 60, condensor 66 with associated blower 68, expansion valve 70, and evaporator 72 with its associated blower 74.

It should be understood that the invention is basically an energy source supplying electricity, heat, and power to drive the compressor. The heat can be employed to provide hot water for washing and other purposes as well as space heating.

Figure 2:
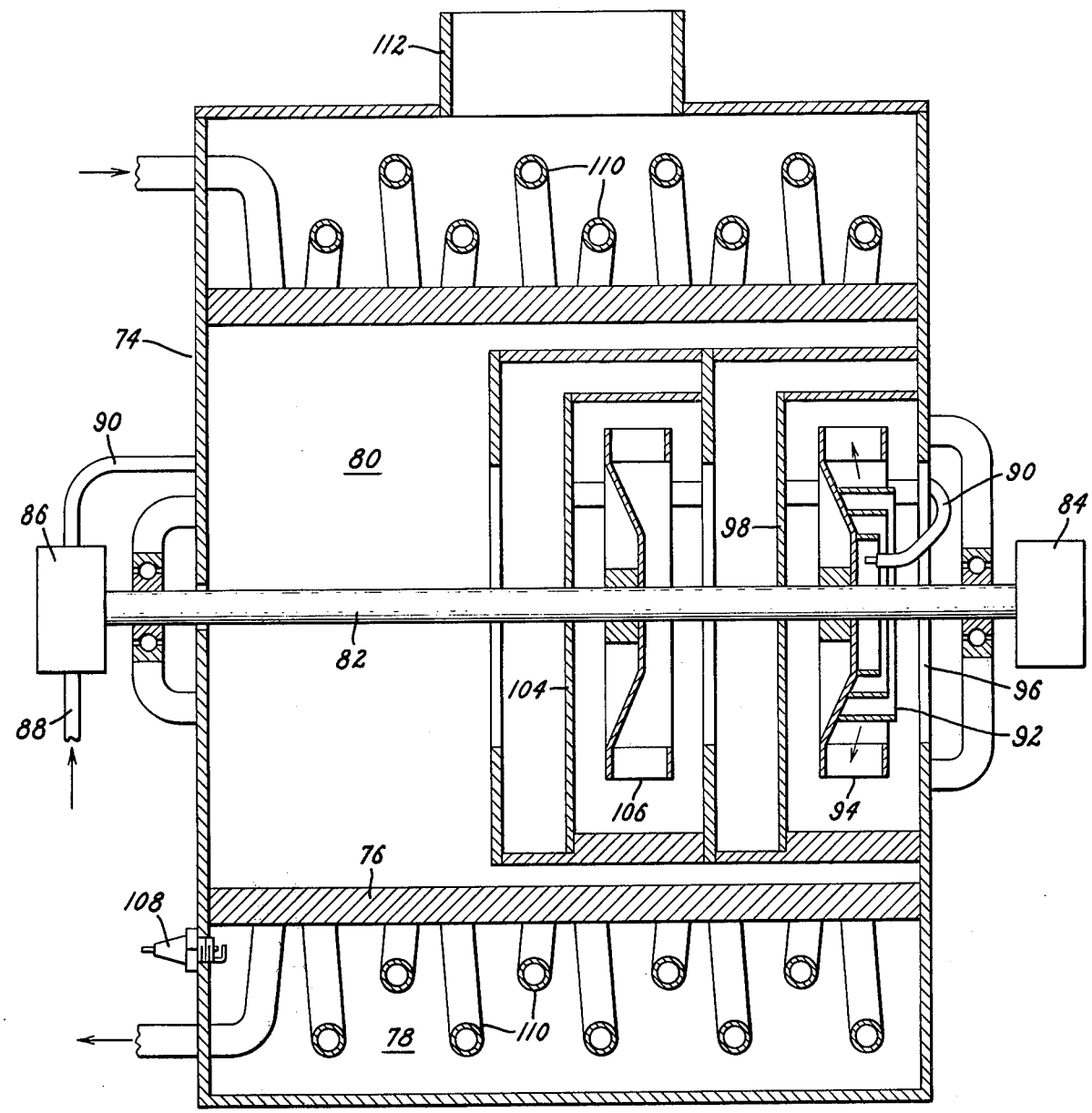
FIG. 2 is a cross-section in elevation of a vapor generator suitable for use in the system of FIG. 1.

In FIG. 2, a vapor generator is shown which can be used as vapor generator 10 of FIG. 1.

The interior of container 74 is divided by porous burner 76 into combustion chamber 78 and plenum 80. Passing through plenum 80 is shaft 82 which is rotated at various desired speeds by motor 84. Rotating with shaft 82 is fuel pump 86. Fuel pump 86 may be of the type disclosed in U.S. Pat. No. 3,647,314. Fuel is admitted to pump 86 via line 88, and is pumped out through line 90.

Figure 3A:
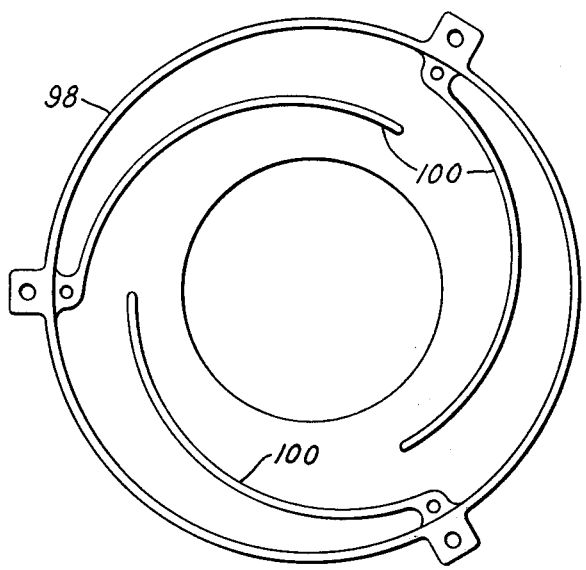
FIGS. 3A–3C are details of a component of the vapor generator of FIG. 2.
Figure 3C:
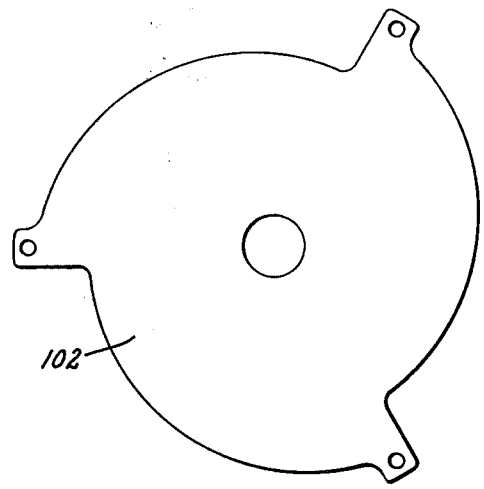
Figure 3B:
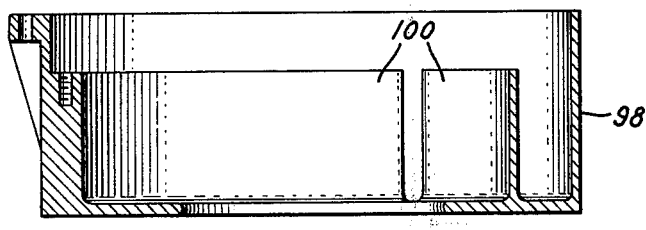

Fuel is ejected from line 90 into atomizer/vaporizer 92. Atomizer/vaporizer 92 has one or more concentric cylindrical walls of porous material and rotates with shaft 82. In passing through the walls the fuel is vaporized or broken into fine drops. The rings serve to distribute the fuel evenly about their circumference and release it in fine drops and vapor. Blower 94, which also rotates with shaft 82, draws in air through central opening 96, and blows it out through scroll 98 (better seen in FIG. 3). Scroll 98 is shown in FIGS. 3A and 3B to include spiral walls 100 which, together with cover 102 in FIG. 3C, increase the pressure of the combustible mixture and directs it to second stage scroll 104 with its blower 106. Second stage scroll 104 further increases the pressure as well as providing additional mixing. From scroll 104 the mixture enters plenum 80 (FIG. 2). In some cases a single stage scroll may be adequate.

The fuel/air mixture enters plenum 80 through exit 106. It passes through porous burner wall 76 and burns on the outer surface of this wall. Ignitor 108 is used to initiate combustion, and coil 110 carries the working fluid to be heated and vaporized. The products of combustion pass out exhaust 112.

It should be recognized that the vapor generator as shown in FIG. 2 is simplified. For example, container 74 would normally be enclosed to provide an air duct in which incoming air would be heated. Similarly, coil 110 may be preceded by a coil imbedded in wall 76 which would serve the dual purpose of heating the working fluid while cooling the wall.

Expander 26 of FIG. 1 will now be described.

Referring to FIGS. 4 and 5, rotor 114 contains axially extending slots 116 designed to receive vanes (not shown in FIGS. 4 and 5). Slots 116 are inclined in the direction of rotation from 4° to 12° to reduce the bending moment on the vanes (which are free to reciprocate in and out as will be described) when they extend from the slots.

The base of each of slots 116 is enlarged to form a slot vapor passage for pressurized vapor. Additional vapor passages 118 extend from the slot vapor passages outwardly to the surface of rotor 114. The pressure of pressurized vapor in the slot vapor passages combines with centrifugal force to force the vanes outwardly.

Turning next to FIGS. 6 and 7, rotor 114 is shown contained within cylindrical liner 120. Because of the eccentric positioning of rotor 114 within liner 120, as rotor 114 rotates, vanes 121 reciprocate in and out in the manner conventional for rotary, vaned devices.

Liner 120 has a plurality of exhaust ports or slots 122 which extend over a circumferential region of the liner which is greater than 90° but less than 180°. The spread and multiplicity of exhaust slots 122 yields two beneficial results. First, greater bearing support for vanes 121 is provided than would be obtained with one or only a few larger exhaust ports. Second, the still pressurized, although expanded, vapor exhausts more gradually, reducing noise.

It will be observed that circumferentially extending slots 122 are arranged in axially spaced rows, and the ends of the slots in one row overlap the ends of the slots in the adjacent row. The latter feature prevents abrupt cut-off of the exhaust.

In FIGS. 8 and 9 the overall expander is illustrated. Endwalls 124 are secured to liner 120 and support output shafts 126 and 128 of rotor 114. Pressurized vapor in tube 130 is admitted through endwalls 124 at a location 136 adjacent to the slot vapor passages when these passages are at or near to top dead center. The vapor expands while turning rotor 114 and is exhausted through exhaust slots 122. Manifold 132 received the exhausted vapor which may be conveyed to a condenser via conduit 134.

Figure 10:
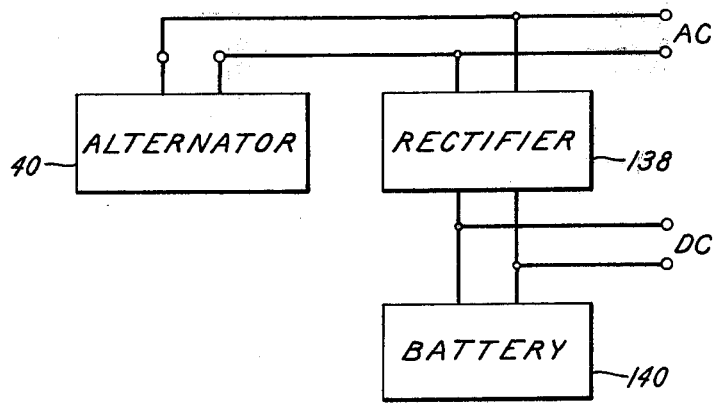
FIG. 10 is a schematic of electrical apparatus associated with the system of FIG. 1.

To start the power generator, electricity must be provided for the feed pump, fuel pump and vapor generator. Referring to FIG. 10, alternator 40 is connected to rectifier 138 which is employed to charge battery 140. Battery 140 thus provides the start-up electricity.

The Rankine cycle generating system as presently configured has the capability of providing a maximum net electrical power output of 6.0 KWe. Net overall engine efficiency is in the range of 7.0% at full power. Depending on the technique used for condensate temperature control, fuel consumption varies from approximately 0.4 gallons/hour at idle conditions (zero net electrical power) to approximately 2.5 gallons/hour at 6.0 KWe.

Although a single embodiment of an integrated electric generating and space heating and cooling system has been shown and described, it will be obvious that changes and modifications can be made without departing from the spirit of the invention and the scope of the appended claims.

What is claimed is:

1. An integrated electric generating and space conditioning system comprising:
   generating means for generating electrical power;
   vapor generator means for vaporizing a motive fluid;
   rotary prime mover means for driving said generator means;
   means for supplying at a controlled rate said vaporized motive fluid to said rotary prime mover means;
   heat exchange means for heating fluid with vapor;
   means for conveying vapor directly to said heat exchange means from said vapor generator;
   means for conveying vapor exhausted from said rotary prime mover means to said heat exchange means;
   condenser means for receiving vapor from said heat exchange means and condensing it;
   pump means for delivering condensed vapor from said condenser means to said vapor generator means;
   a motor for driving said pump; and
   heating means for producing sensible heat for space heating from said heated fluid.

2. An integrated electric generating and space conditioning system in accordance with claim 1 further including:
   compressor means for compressing a refrigerant;
   first clutch means for connecting said motor to drive said compressor; and
   second clutch means for connecting said rotary prime mover to drive said compressor.

3. An integrated electric generating and space conditioning system in accordance with claim 1 wherein:
   said rotary prime mover is a multivaned expander.

4. An integrated electric generating and space conditioning system in accordance with claim 3 further comprising:
   means for combining lubricating oil with the vaporized motive fluid prior to supplying it to said multivaned expander; and
   separator means for separating said oil from said condensed motive fluid prior to delivering it to said vapor generating means.

* * * * *